(12) United States Patent
Shaw

(10) Patent No.: US 8,267,447 B2
(45) Date of Patent: Sep. 18, 2012

(54) LIFTING HOOK ASSEMBLIES AND METHODS OF MANUFACTURING SAME

(75) Inventor: Matt Shaw, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 361 days.

(21) Appl. No.: 12/168,399

(22) Filed: Jul. 7, 2008

(65) Prior Publication Data

US 2010/0003115 A1  Jan. 7, 2010

(51) Int. Cl.
*B66C 1/00* (2006.01)
(52) U.S. Cl. ......................... 294/67.2; 414/543
(58) Field of Classification Search .......... 294/67.2, 294/67.21, 67.22, 67.5; 248/121, 122.1, 248/288.11, 291.1, 292.12, 294.1, 298.1; 414/463, 429, 427, 563, 253, 543, 542, 920, 414/908, 910, 911; 254/323, 326, 327, 332, 254/335, 336; 187/238
See application file for complete search history.

(56) References Cited

U.S. PATENT DOCUMENTS

| | | | | |
|---|---|---|---|---|
| 4,991,810 A | * | 2/1991 | Andrus et al. | 248/286.1 |
| 5,064,078 A | * | 11/1991 | Van Staveren | 212/180 |
| 5,064,334 A | * | 11/1991 | Cooley | 414/428 |
| 5,431,526 A | * | 7/1995 | Peterson et al. | 414/543 |
| 5,505,578 A | * | 4/1996 | Fuller | 414/427 |
| 5,551,936 A | * | 9/1996 | Parisi et al. | 482/142 |
| 6,109,859 A | * | 8/2000 | Domann | 414/729 |
| 6,578,892 B2 | * | 6/2003 | Tsimmerman | 294/67.21 |
| 6,857,839 B2 | * | 2/2005 | Pitoniak | 414/462 |
| 7,111,826 B2 | * | 9/2006 | Cook et al. | 254/329 |
| 7,377,740 B2 | * | 5/2008 | Panzarella et al. | 414/543 |
| 2006/0062661 A1 | * | 3/2006 | Panzarella et al. | 414/542 |

* cited by examiner

*Primary Examiner* — Dean Kramer
*Assistant Examiner* — Stephen Vu

(57) ABSTRACT

In an example embodiment, a lifting hook assembly comprises an elongated body, an adjustable arm, a joint assembly, and a lifting arm. The elongated body acts as a frame and skeleton for the lifting hook assembly. The adjustable arm is in communication with a first end of the elongated body, and is engageable to the lifting apparatus. The joint assembly is adapted to fix the adjustable arm at two or more predetermined angles with respect to the elongated body. The adjustability of the joint assembly can enable the adjustable arm to engage the lifting apparatus directly above the center of mass of the wheel weight, thereby balancing the wheel weight. The lifting arm extends from a second end of the elongated body, and is engageable to the wheel weight.

9 Claims, 6 Drawing Sheets

LIFTING HOOK ASSEMBLIES AND METHODS OF MANUFACTURING SAME

BACKGROUND

Various aspects of the present invention relate to lifting hook assemblies and, moreover, to lifting hook assemblies used to mount and remove wheel weights.

Wheel weights are often used to increase traction for off-road vehicles, such as tractors. Inappropriately used wheel weights, however, can cause a tractor to flip over, severely injuring or killing the operator of the tractor. Further, the additional weight can stress components of the tractor. Accordingly, manufacturers recommend that wheel weights be removed in certain instances and, therefore, remounted when needed.

Mounting a wheel weight requires lifting and balancing the wheel weight while aligning apertures in the wheel weight with bolts inserted through a wheel rim. Only after the wheel weight is correctly aligned, can the wheel weight slide onto the wheel. Removing the wheel weight is accomplished by reversing this process. Because wheel weights can weigh up to 1600 pounds, mounting and removing wheel weights can prove both difficult and time-consuming.

SUMMARY

There is a need in the art for a tool, such as a lifting hook assembly, for mounting and removing wheel weights.

Briefly described, various embodiments of the present invention include a lifting hook assembly for lifting one or more wheel weights. The lifting hook assembly eases the task of mounting or removing a wheel weight. The lifting hook assembly comprises an elongated body, an adjustable arm, a joint assembly, and a lifting arm.

The elongated body acts as a frame or skeleton for the lifting hook assembly.

The adjustable arm can be engageable to a lifting apparatus, such as a forklift or tractor, which uses the lifting hook assembly to lift the wheel weight. The adjustable arm couples the lifting hook assembly to the lifting apparatus. Additionally, the adjustable arm is in communication with one end of the elongated body.

The joint assembly couples the adjustable arm to the elongated body, such that the adjustable arm is fixable at predetermined angles with respect to the elongated body.

The lifting arm extends from an end of the elongated body opposing the adjustable arm, and can be engageable to the wheel weight.

Accordingly, the lifting apparatus can use the lifting hook assembly to lift the wheel weight for ease of mounting or removing the wheel weight from a wheel.

These and other objects, features, and advantages of the present invention will become more apparent upon reading the following specification in conjunction with the accompanying drawing figures.

DETAILED DESCRIPTION

Figure 1:
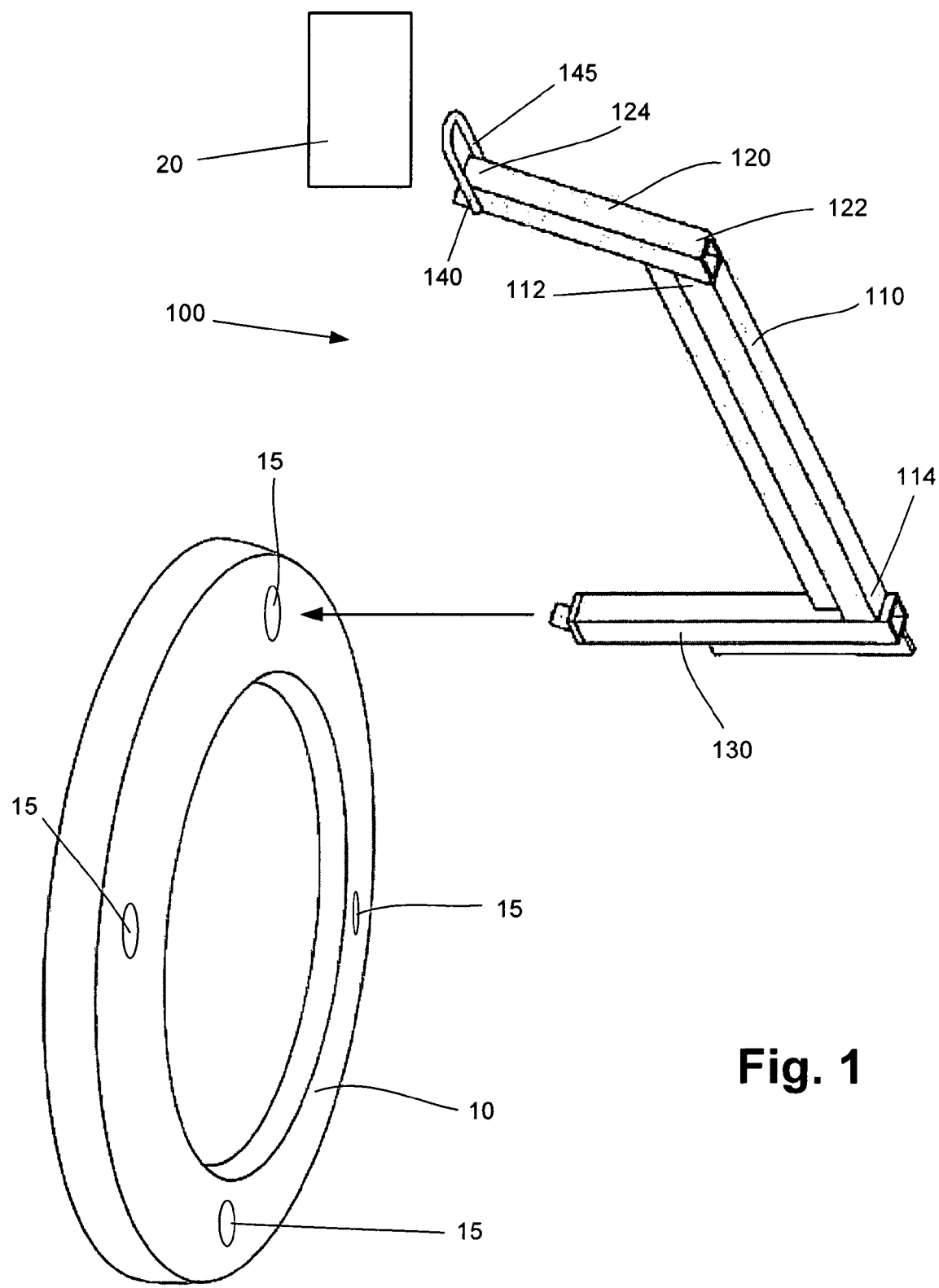
FIG. 1 illustrates a perspective view of a lifting hook assembly, according to an exemplary embodiment of the present invention.

To facilitate an understanding of the principles and features of the invention, various illustrative embodiments are explained below. In particular, the invention is described in the context of being a lifting hook assembly for lifting one or more wheel weights. Embodiments of the invention, however, are not limited to lifting wheel weights. Rather, embodiments of the invention can be used to lift many objects too heavy or awkward to be easily lifted by hand.

The components described hereinafter as making up the various elements of the invention are intended to be illustrative and not restrictive. Many suitable components that would perform the same or similar functions as the components described herein are intended to be embraced within the scope of the invention. Such other components not described herein can include, but are not limited to, for example, components that are developed after development of the invention.

Various embodiments of the present invention comprise lifting hook assemblies and methods for manufacturing lifting hook assemblies. Exemplary embodiments of the present invention can comprise an elongated body, an adjustable first arm, and a lifting second arm.

Referring now to the figures, wherein like reference numerals represent like parts throughout the views, the lifting hook assembly will be described in detail.

FIG. 1 illustrates a perspective view of a lifting hook assembly 100. The lifting hook assembly 100 comprises an elongated body 110, a first arm 120, and a second arm 130. Each of these elements 110, 120, and 130 can be composed of many materials, including heavy duty metals such as iron, cast iron, copper, steel, and aluminum. Preferably, though not required, the lifting hook assembly 100 is capable of lifting and supporting at least 1600 pounds.

The elongated body 110 includes a first end 112 and a second end 114. Generally, the elongated body 110 acts as a backbone and frame for other components of the lifting hook assembly 100. The elongated body 110 can be a tube, a pipe, a shaft, or many other elongated shapes. The elongated body 110 can have a hollow center or a filled center, depending on needs of a user. A hollow center provides for a lighter lifting hook assembly 100, while a filled center can result in a stronger lifting hook assembly 100.

The first arm, which performs as an adjustable arm 120, extends from proximate the first end 112 of the elongated body 110. A portion in proximity to a first end 122 of the adjustable arm 120 is in communication with a portion proximate the first end 112 of the elongated body 110. At a second end 124 of the adjustable arm 120, the adjustable arm 120 is engageable to a lifting apparatus 20. The lifting apparatus 20 can be a machine, such as a forklift or tractor, that carries and uses the lifting hook assembly 100 to lift an object, such as a wheel weight 10.

In proximity to its second end 124, the adjustable arm 120 can have an adapting member 140. The adapting member 140 can perform as an interface between the lifting hook assembly 100 and the lifting apparatus 20, enabling the lifting hook assembly 100 to operate with the lifting apparatus 20. The adapting member 140 can be connected, or engaged, to the adjustable arm 120 and engageable to the lifting apparatus 20. For example and not limitation, the adapting member 140 can comprise a hook or loop 145 connected to the adjustable arm 120 as shown; the hook or loop 145 adapted to be disposed about a protruding member of the lifting apparatus 20. Additionally or alternatively, the adapting member 140 can comprise a clamping mechanism, or the adapting member 140 can comprise an aperture, through which a wire or rod from the lifting apparatus 20 can be threaded therethrough.

The second arm, which acts as a lifting arm 130, extends from, or is appended to, the second end 114 of the elongated body 110, or a portion of the elongated body 110 proximate the second end 114. The lifting arm 130 can extend from the elongated body 110 at one of many angles, but for stability of the assembly 100, the lifting arm 130 is preferably approximately normal to the elongated body 110. Also preferably, the lifting arm 130 is capable of supporting at least 50 pounds if designed for lighter wheel weights, and at least 1600 pounds if designed for heavier wheel weights. The lifting arm 130 is engageable to the wheel weight 10, and at least a portion of the lifting arm 130 can be fittable into an aperture 15 of the wheel weight 10.

Figure 2:
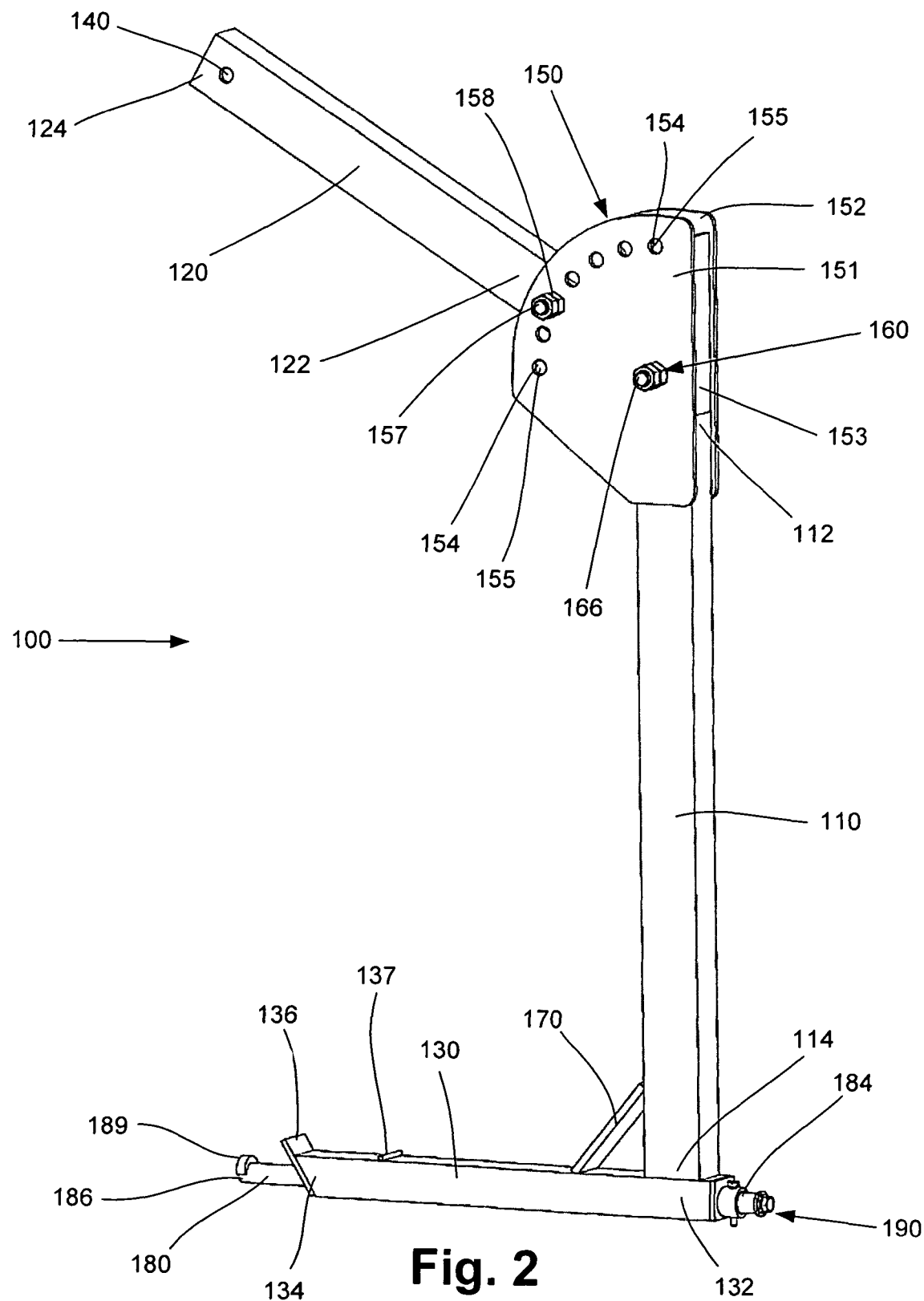
FIG. 2 illustrates another perspective view of the lifting hook assembly, according to an exemplary embodiment of the present invention.
Figure 3:
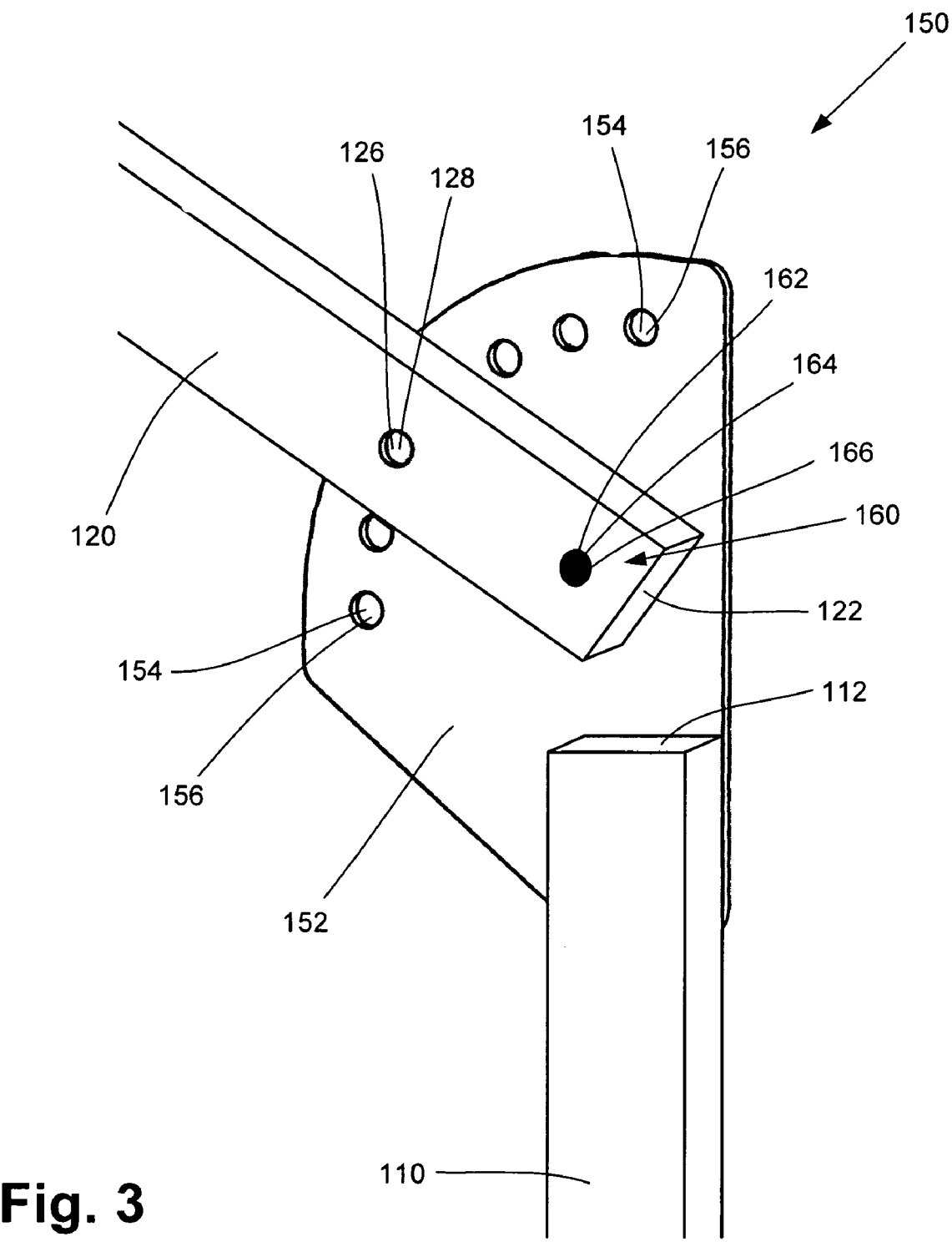
FIG. 3 illustrates a close-up perspective view of a partial joint assembly for the lifting hook assembly, according to an exemplary embodiment of the present invention.

Referring now to FIGS. 2-3, a perspective view of the lifting hook assembly 100 is illustrated in FIG. 2, and a close-up perspective view of a partial joint assembly 150 of the lifting hook assembly 100 is illustrated in FIG. 3. To illustrate the interior of the joint assembly 150, a front face 151 of the joint assembly 150 is not visible in FIG. 3.

As shown in FIGS. 2-3, the adjustable arm 120 can be pivotably connected to the elongated body 110 by an adjustable joint, such as the joint assembly 150, positioned between the adjustable arm 120 and the elongated body 110. The joint assembly 150 is adapted to adjust the angle between the adjustable arm 120 and the elongated body 110. Specifically, the joint assembly 150 can adjust the adjustable arm 120 to two or more predetermined angles with respect to the elongated body 110. The adjustability of the joint assembly 150 can enable the adapting member 140 to be positioned directly above the center of gravity of the wheel weight 10 during lifting, thereby improving the balance of the load.

The joint assembly 150 can comprise a front face 151 and a rear face 152 opposing each other. Though the faces 151 and 152 are described herein based on figures as "front" and "rear," one skilled in the art would appreciate that these terms relate to components on opposing sides of the lifting hook assembly 100. That is to say that the present invention contemplates the "front" and "rear" faces 151 and 152 of the joint assembly 150 being positioned at many angles. Thus, when these terms are used herein, they are meant only to identify relative placement of the faces 151 and 152 with respect to each other, and to describe views of the figures.

The front and rear faces 151 and 152 of the joint assembly 150 can be positioned parallel to and, preferably, aligned with each other. A separator 153 can be positioned between the front and rear faces 151 and 152, connected to and in communication with the faces 151 and 152. The separator 153 provides sufficient space between the front and rear faces 151 and 152 for operation of the joint assembly 150.

The front face 151 and the rear face 152 can be positioned on either side of the adjustable arm 120 and the elongated body 110, such that the first end 122 of the adjustable arm 120 and the first end 112 of the elongated body 110 are positionable between the two faces 151 and 152. The elongated body 110 can, but need not, be immovably fixed to at least one of the faces 151 and 152. In contrast, and as further described below, the adjustable arm 120 can be slidable with respect to at least one of the front and rear faces 151 and 152.

To facilitate adjustment, the joint assembly 150 and the adjustable arm 120 incorporate various complimentary elements. A fastening assembly 160 can comprise a combination of complimentary elements of the joint assembly 150 and the adjustable arm 120. Additionally, the joint assembly 150 can comprise two or more joint receiving members 154, each complimentary to a single arm receiving member 126 (see FIG. 3) of the adjustable arm 120.

The fastening assembly 160 couples, or fastens, the joint assembly 150 to the adjustable arm 120. The fastening assembly 160 facilitates pivoting of the adjustable arm 120 about an axis perpendicular to the faces 151 and 152 of the joint assembly 150. In other words, as the adjustable arm 120 pivots, the adjustable arm 120 remains generally in a plane defined by the joint assembly 150, specifically, defined by the faces 151 and 152 of the joint assembly 150.

The fastening assembly 160 can have many implementations. For example and not limitation, the fastening assembly 160 can comprise a fastening aperture 162 (see FIG. 3), a first arm aperture 164 (see FIG. 3), and a first securing member 166.

The fastening aperture 162 is defined by the joint assembly 150. The fastening aperture 162 can be an aperture through the entire joint assembly 150, i.e., through both faces 151 and 152, or can be an aperture through just the front face 151.

The first arm aperture 164 is complimentary to the fastening aperture 162, and is defined by the adjustable arm 120, proximate the first end 122 of the adjustable arm 120.

The first securing member 166 is engageable to the fastening aperture 162 and to the first arm aperture 164, such that the first securing member 166 is fittable through both apertures 162 and 164. The first securing member 166 can comprise one or more screws, pins, clamps, adhesives, and the like. The first securing member 166 defines a pivot point for the adjustable arm 120. Accordingly, when the first securing member 166 is secured through the fastening aperture 162 and the first arm aperture 164, the adjustable arm 120 is pivotable about the first securing member 166.

As mentioned above, the joint assembly 150 further comprises two or more joint receiving members 154. The angle between the adjustable arm 120 and the elongated body 110 differs based on which joint receiving member 154 is engaged to the adjustable arm 120.

Each joint receiving member 154 can comprise at least one aperture, such as a front receiving aperture 155 (see FIG. 2) or a rear receiving aperture 156 (see FIG. 3). The front receiving apertures 155, or front apertures, are defined by the front face 151 of the joint assembly 150. If rear receiving apertures 156, or rear apertures, are provided, these are defined by the rear face 152 of the joint assembly 150. Each joint receiving member 154 comprises at least a front aperture 155 and, if rear apertures 156 are provided, a corresponding rear aperture 156. Preferably, corresponding front and rear apertures 155 and 156 are generally aligned.

As also mentioned above, the adjustable arm 120 can comprise an arm receiving member 126 (see FIG. 3) proximate the first end 122 of the adjustable arm 120. The arm receiving member 126 is complimentary to each joint receiving member 154. Accordingly, the adjustable arm 120 is engageable to each individual joint receiving member 154 at the arm receiving member 126. Similar to the joint receiving members 154, the arm receiving member 126 can comprise an arm aperture, a second arm aperture 128.

A second securing member 157 (see FIG. 2) can be engageable, and releasably securable, to each joint receiving member 154 and to the arm receiving member 126. The second securing member 157 can comprise one or more screws, pins, clamps, adhesives, and the like.

To engage the adjustable arm 120 to a joint receiving member 154, the second securing member 157 releasably secures the arm receiving member 126 to the joint receiving member 154. This secures the adjustable arm 120 at a fixed angle with respect to the elongated body 110. To this end, the second securing member 157 is inserted through the front aperture 155, through the second arm aperture 128, and, if provided, through the rear aperture 156 as well. The second securing member 157 can, but need not, be fixed in such position through use of a locking member 158, such as a nut.

Adjusting the angle between the adjustable arm 120 and the elongated body 110 can comprise releasing the second securing member 157 from the arm receiving member 126 and from the applicable joint receiving member 154, pivoting the adjustable arm 120 to a different angle, and then securing the second securing member 157 to a different joint receiving member 154 and to the adjustable arm 120.

The second securing member 157 need not be implemented as described above, but can have many implementations. For example and not limitation, the second securing member 157 can comprise a spring-activated pin, where a spring is compressed when the pin is retracted from the arm receiving member 126 and a joint receiving member 154. In such an implementation, a user can retract the pin, pivot the adjustable arm 120, and then release the pin. When the pin is released, the spring will relax to some degree, thereby causing the pin to be inserted into an aligned joint receiving member 154 and through the arm receiving member 126.

Preferably, in this alternate implementation, the pin is coupled to the fastening assembly 160, such that as the adjustable arm 120 pivots, the pin is shifted to remain in alignment with the arm receiving member 126.

Referring now specifically to FIG. 2, a bracing member 170 can be secured between the lifting arm 130 and the elongated body 110. The bracing member 170 can be connected to the lifting arm 130 in proximity to a first end 132 of the lifting arm 130, and to the elongated body 110 proximate the second end 114 of the elongated body 110. Accordingly, the bracing member 170 forms a triangle between the elongated body 110 and the lifting arm 130. The bracing member 170 can support the lifting arm 130. The bracing member 170 can increase the downward force needed to overburden the lifting arm 130 and, therefore, increase the load-bearing capability of the lifting arm 130. Further, the bracing member 170 can maintain the desired angle between the elongated body 110 and the lifting arm 130, such as approximately normal.

The lifting arm 130 can have, or can be in communication with, a first retaining member 136 in proximity to a second end 134 of the lifting arm 130. The first retaining member 136 can be a protrusion extending from the lifting arm 130. Alternatively, the first retaining member 136 can be a component appended to the second end 134 of the lifting arm 130 at a generally upward angle, as shown. As the wheel weight 10 is lifted, the first retaining member 136 reduces premature disengagement of the wheel weight 10 from the lifting arm 130. The first retaining member 136 can secure the wheel weight 10 to the lifting arm 130.

Figure 4:
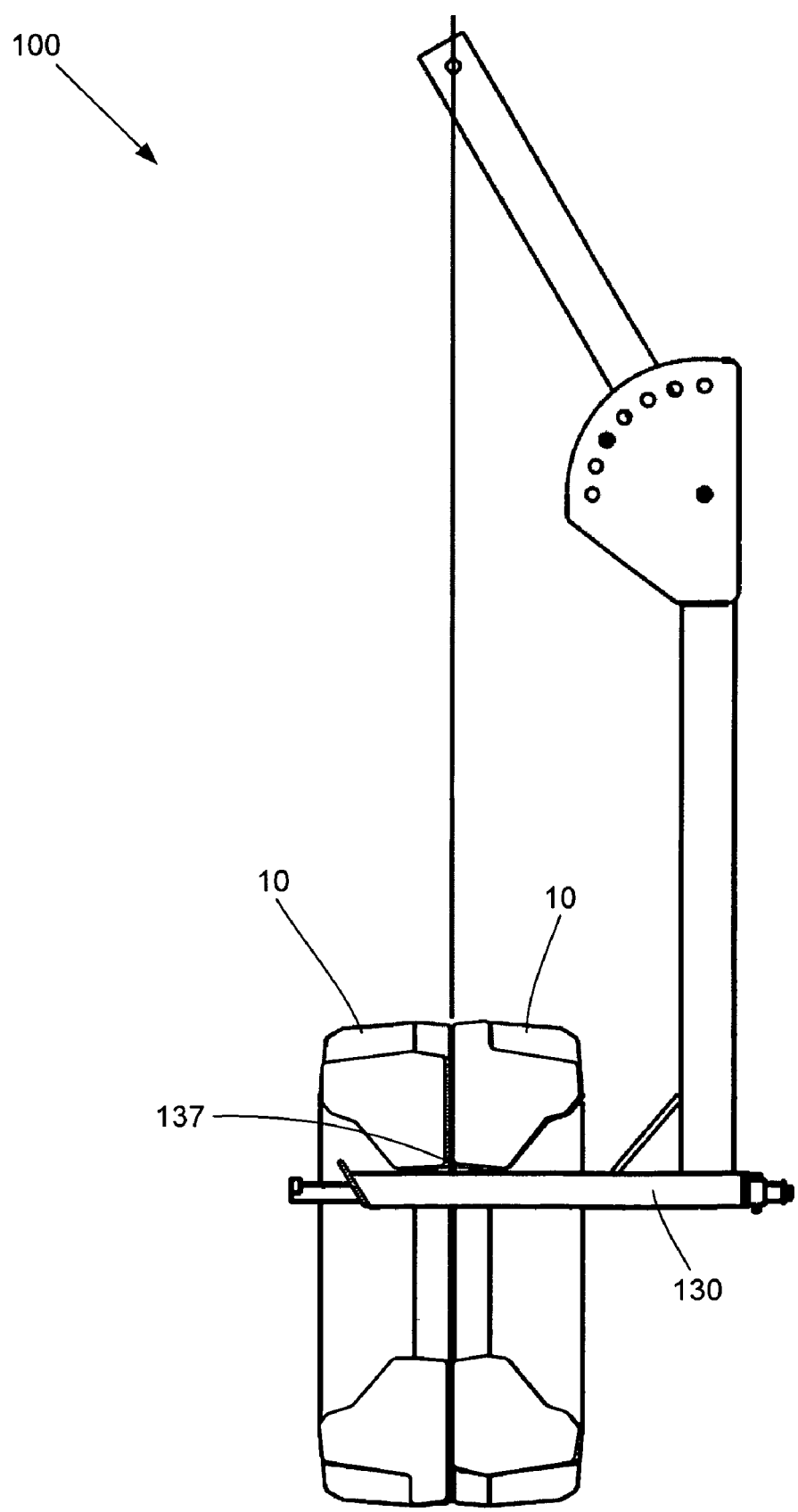
FIG. 4 illustrates a side view of the lifting hook assembly engaged to a pair of wheel weights, according to an exemplary embodiment of the present invention.

The lifting arm 130 can further comprise a weight stabilizer 137. FIG. 4 illustrates the lifting hook assembly 100 engaged to two wheel weights 10 with each wheel weight on either side of the weight stabilizer 137. The weight stabilizer 137 stabilizes the wheel weight 10 to prevent or reduce the wheel weight 10 from sliding or wobbling on the lifting arm 130. The weight stabilizer 137 can also assist in placement of the wheel weight 10 at an appropriate position along the lifting arm 130. The weight stabilizer 130 can act as a guide for positioning the wheel weight 100 generally directly below the adapting member 140 and in a generally vertical orientation. Accordingly, the weight stabilizer 137 can contribute to properly balancing the wheel weight 10, thereby reducing dislodging of the wheel weight, which could cause harm to an operator of the lifting apparatus 20.

A retractable arm 180, or slidable arm, can be in communication with the lifting arm 130 or can be an extension of the lifting arm 130. The retractable arm 180 can have a smaller diameter than the lifting arm 130. For a wheel weight 10 having a relatively small aperture 15, at least a portion of the retractable arm 180 can be fittable into the small aperture 15 to allow the wheel weight 10 to be lifted. The retractable arm 180 provides further versatility of the lifting hook assembly 100, enabling the lifting hook assembly 100 to engage a wheel weight 10 farther removed from the lifting apparatus 20.

Additionally, or alternatively to the retractable arm 180, the lifting arm 130 can have telescoping characteristics. With telescoping, the extreme second end 134 of the extended lifting arm 130 can have a smaller diameter than does the second end 134 of the non-extended lifting arm 130.

If provided, the retractable arm 180 can be retractably secured to the lifting arm 130, and extendable from the lifting arm. The lifting arm 130 can define a hollow cavity 138 (see FIGS. 5A-5B) and can be, thereby, adapted to receive the retractable arm 180. The retractable arm 180 can be fittable into the cavity 138 and slidably secured to the interior of the lifting arm 130. As a result, the retractable arm 180 is longitudinally slidable in the interior of the lifting arm 130.

Figure 5A:
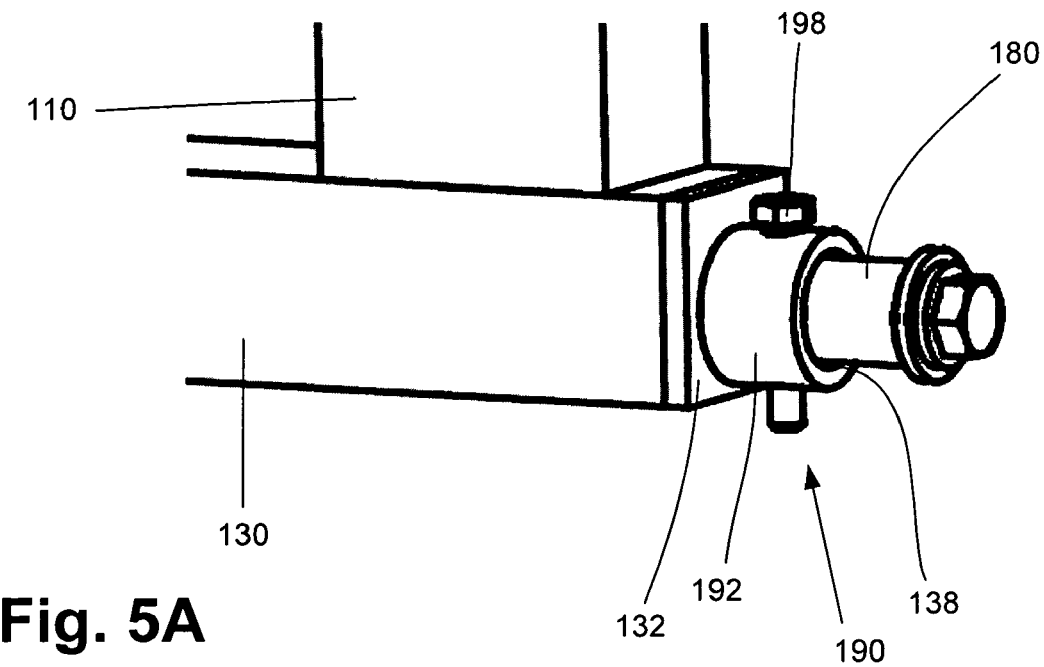
FIG. 5A illustrates a close-up perspective view of a locking mechanism of the lifting hook assembly, according to an exemplary embodiment of the present invention.
Figure 5B:
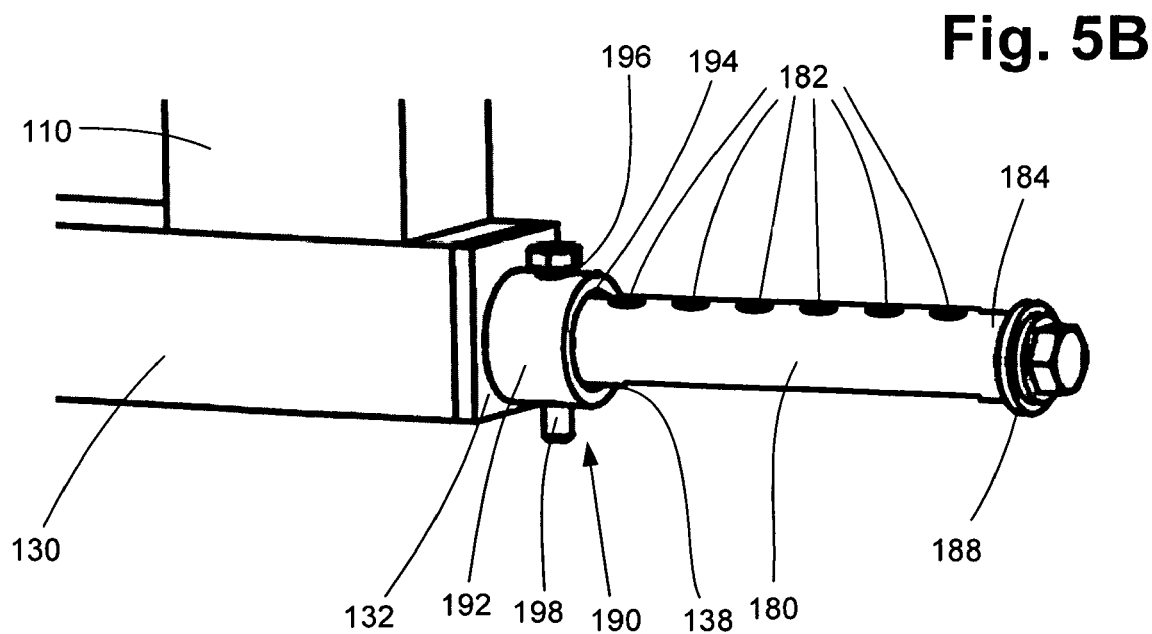
FIG. 5B illustrates another close-up perspective view of the locking mechanism, according to an exemplary embodiment of the present invention.

A locking mechanism 190 can be provided to retract and extend the retractable arm 180. Referring now to FIGS. 5A-5B, close-up perspective views of the locking mechanism 190 are illustrated. FIG. 5A illustrates the locking mechanism 190 when the retractable arm 180 is fully extended, and FIG. 5B illustrates the locking mechanism 190 when the retractable arm 180 is retracted to a degree.

As shown in FIGS. 5A-5B, the locking mechanism 190 can be positioned in proximity to the first end 132 of the lifting arm 130. The locking mechanism 190 can fix the position of the retractable arm 180 with respect to the lifting arm 130. As illustrated, the locking mechanism 190 can comprise a collar 192 and a locking pin 198.

Referring now specifically to FIG. 5B, the collar 192 can be in communication with the first end 132 of the lifting arm 130. The collar 192 defines a cavity 194 for receiving the retractable arm 180. The collar 192 is aligned with an opening of the cavity 138 of the lifting arm 130, such that the retractable arm 180 is fittable through, and can be disposed through, the cavities 138 and 194 of the lifting arm 130 and the collar 192 simultaneously.

The collar 192 can further define an aperture 196 for receiving the locking pin 198. Additionally, the retractable arm 180 defines a row of two or more apertures 182 engageable to the locking mechanism 190, specifically to the locking pin 198. The locking pin 198 is fittable through the aperture 196 in the collar 192 and through each aperture 182 in the retractable arm 180 to secure the retractable arm 180 in a position with respect to the lifting arm 130.

Each aperture 182 in the retractable arm 180 defines a predetermined position of the retractable arm 180 with respect to the lifting arm 130. Further, each aperture 182 of the retractable arm 180 defines a predetermined position of a first end 184 of the retractable arm 180 with respect to the first end 132 of the lifting arm 130, as well as a predetermined position of a second end 186 (see FIG. 2) of the retractable arm 180 with respect to the second end 134 of the lifting arm 130. Such predetermined positions are distinct for distinct apertures 182 of the retractable arm 180.

Accordingly, adjusting the retractable arm 180 comprises disengaging the locking pin 198 from a first aperture 182 in the retractable arm 180, sliding the retractable arm 180 longitudinally in either direction, and securing the locking pin 198 through a second aperture 182 in the retractable arm 180.

The retractable arm 180 further comprises a stopper 188 adapted to prevent the first end 184, or a portion in proximity to the first end 184, of the retractable arm 180 from entering the cavity 138 of the lifting arm 130. The stopper 188 prevents or reduces the retractable arm 180 sliding completely through the lifting arm 130, thereby exiting the cavity 138 at the second end 134 of the lifting arm 130 and separating from the lifting arm 130.

Referring back to FIG. 2, like the lifting arm 130, the retractable arm 180 can have a retaining member, a second retaining member 189, at or in proximity to the second end 186 of the retractable arm 180. When the retractable arm 180 is in use, the second retaining member 189 can be adapted to secure the wheel weight 10 or to reduce premature disengagement of the wheel weight 10 from the retractable arm 180. The second retaining member 189 can be a protrusion extending from the retractable arm 180. Alternatively, the second retaining member 189 can be a component appended to the second end 134 of the lifting arm 130 at a generally upward angle, as shown.

Figure 6:
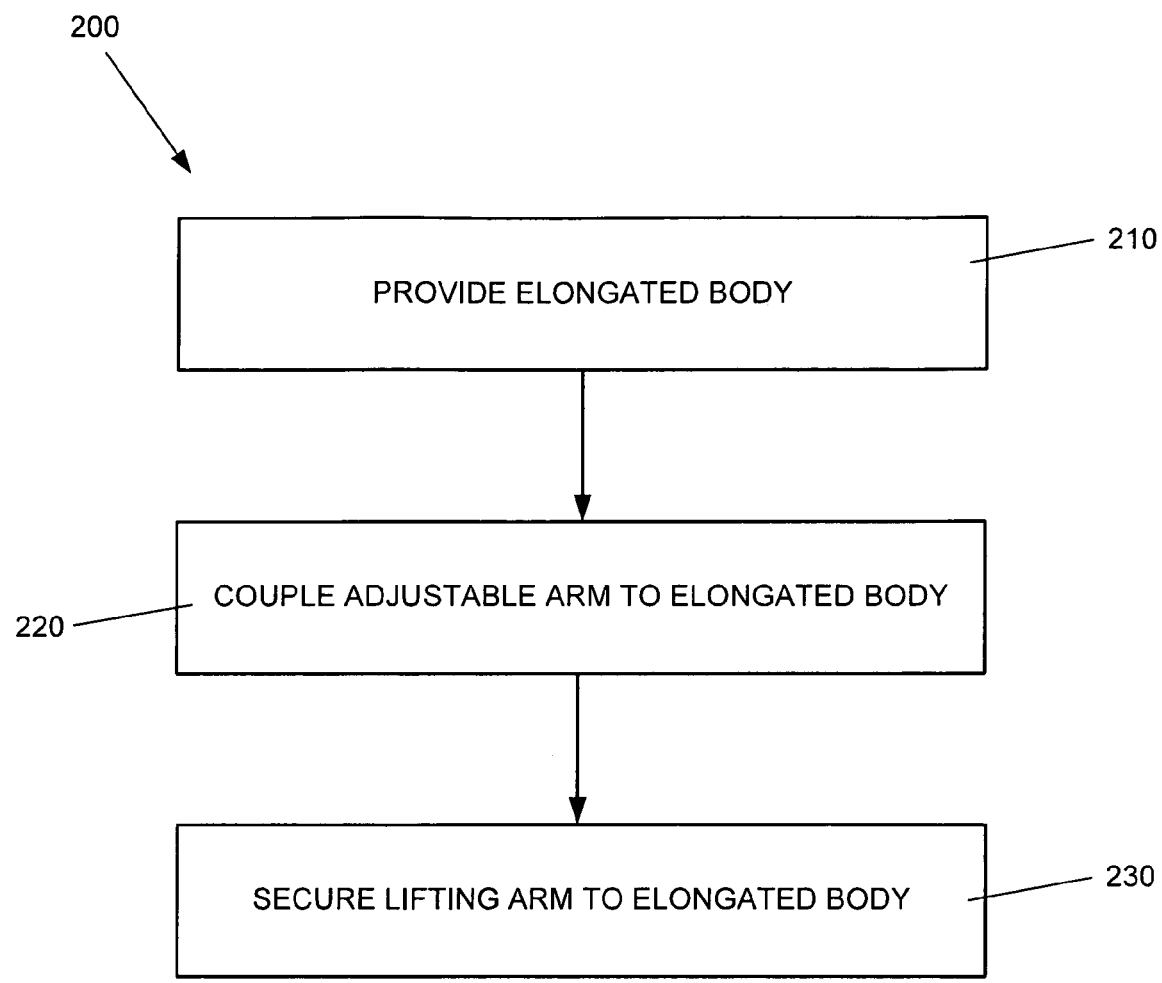
FIG. 6 illustrates a flow diagram of a method of manufacturing the lifting hook assembly, according to an exemplary embodiment of the present invention.

FIG. 6 illustrates a flow diagram of a method of manufacturing the lifting hook assembly 100, according to some embodiments of the present invention. Each box in FIG. 6 represents a sub-process of the overall manufacturing process. Those of skill in the art would appreciate that the sub-processes illustrated in FIG. 6 need not be undertaken in the order illustrated, and one or more of the sub-processes can be segments of other sub-processes. Further, not all of the sub-processes illustrated need be undertaken for every embodiment of the manufacturing process, and additional sub-processes can be provided.

In an exemplary embodiment, the manufacturing process 200 comprises providing the elongated body 110 at 210.

At 220, the adjustable arm 120 is coupled to the elongated body 110. Generally, the first end 112 of the elongated body 110 is coupled to first end 122 of the adjustable arm 120. Coupling the adjustable arm 120 and the elongated body 110 can comprise providing the joint assembly 150 between the adjustable arm 120 and the elongated body 110. The joint assembly 150 can be configured with at least two joint receiving members 154.

Although not shown in FIG. 6, an adapting member 140 can be secured to the second end 124 of the adjustable arm 120.

At 230, the lifting arm 130 is secured, or appended, to the elongated body 110. Specifically, a region proximate the first end 132 of the lifting arm 130 and a region proximate the second end 114 of the elongated body 110 can be secured together. The second end 134 of the lifting arm 130 can be engageable to the wheel weight 10.

Additionally, the bracing member 170 can be secured between the elongated body 110 and the lifting arm 130. The first retaining member 136 can be secured to the lifting arm 130. Further, the retractable arm 180 can be retractably secured to the lifting arm 130, and the second retaining member 189 can be secured to the retractable arm 180.

While the invention has been disclosed in exemplary forms, it will be apparent to those skilled in the art that many modifications, additions, and deletions can be made without departing from the spirit and scope of the invention and its equivalents, as set forth in the following claims.

What is claimed is:

1. A lifting hook assembly for lifting an object, the lifting hook assembly comprising:
    an elongated body comprising a first end and a second end;
    an adjustable arm comprising a first end and a second end, the first end of the elongated body in communication with the first end of the adjustable arm;
    a lifting arm extendable from a portion of the elongated body in proximity to the second end of the elongated body, the lifting arm configured to engage the object;
    a retractable arm in communication with the lifting arm, the retractable arm extendable from the lifting arm;
    an adapting member configured to interface with a lifting apparatus to lift the object and position a wire of a lifting apparatus directly over an object engaged by the lifting arm; and
    a locking mechanism for fixing the retractable arm at two or more predetermined positions with respect to the lifting arm.

2. The lifting hook assembly of claim 1, the locking mechanism further comprising:
    a collar defining a cavity for receiving the retractable arm; and
    a locking pin, the collar having an aperture for receiving the locking pin;
    wherein the locking pin is insertable through the aperture and through any one of a plurality of apertures of the retractable arm to fix the retractable arm in position with respect to the lifting arm.

3. The lifting hook assembly of claim 1, further comprising a weight stabilizer on the lifting arm.

4. The lifting hook assembly of claim 3, wherein the adapting member is configured for vertical alignment with the weight stabilizer.

5. The lifting hook assembly of claim 1, wherein the lifting arm is configured to extend at least partly into an aperture of a wheel weight.

6. The lifting hook assembly of claim 1, wherein the lifting arm is configured to engage and support the object.

7. A lifting hook assembly for lifting an object, the lifting hook assembly comprising:
    an elongated body comprising a first end and a second end;
    an adjustable arm comprising a first end and a second end, the first end of the elongated body in communication with the first end of the adjustable arm;
    a lifting arm extendable from a portion of the elongated body in proximity to the second end of the elongated body, the lifting arm configured to engage the object;
    a retractable arm in communication with the lifting arm, the retractable arm extendable from the lifting arm;
    an adapting member configured to interface with a lifting apparatus to lift the object and position a wire of a lifting apparatus directly over an object engaged by the lifting arm; and a joint assembly adapted to fix the adjustable arm at two more predetermined angles with respect to the elongated body.

8. The lifting hook assembly of claim 7, the joint assembly comprising at least two receiving members, each adapted to releasably secure the adjustable arm at a fixed angle relative to the elongated body.

9. A lifting hook assembly for lifting an object, the lifting hook assembly comprising:
an elongated body comprising a first end and a second end;
an adjustable arm comprising a first end and a second end, the first end of the elongated body in communication with the first end of the adjustable arm;
a lifting arm extendable from a portion of the elongated body in proximity to the second end of the elongated body, the lifting arm configured to engage the object;
a retractable arm in communication with the lifting arm, the retractable arm extendable from the lifting arm;
an adapting member configured to interface with a lifting apparatus to lift the object and position a wire of a lifting apparatus directly over an object engaged by the lifting arm;
the retractable arm defining a row of two or more apertures, each engageable to a locking mechanism, wherein engagement of the locking mechanism to a first aperture of the retractable arm results in a different position of the retractable arm with respect to the lifting arm than does engagement of the locking mechanism to a distinct second aperture of the retractable arm.

* * * * *